Oct. 18, 1966 C. W. TELLEFSON ETAL 3,279,017
CABLE GRIPPER
Filed Sept. 24, 1964 2 Sheets-Sheet 1

INVENTORS
ROBERT M. BUSH
BY CLAIR W. TELLEFSON
H. W. Brelsford
ATTORNEY

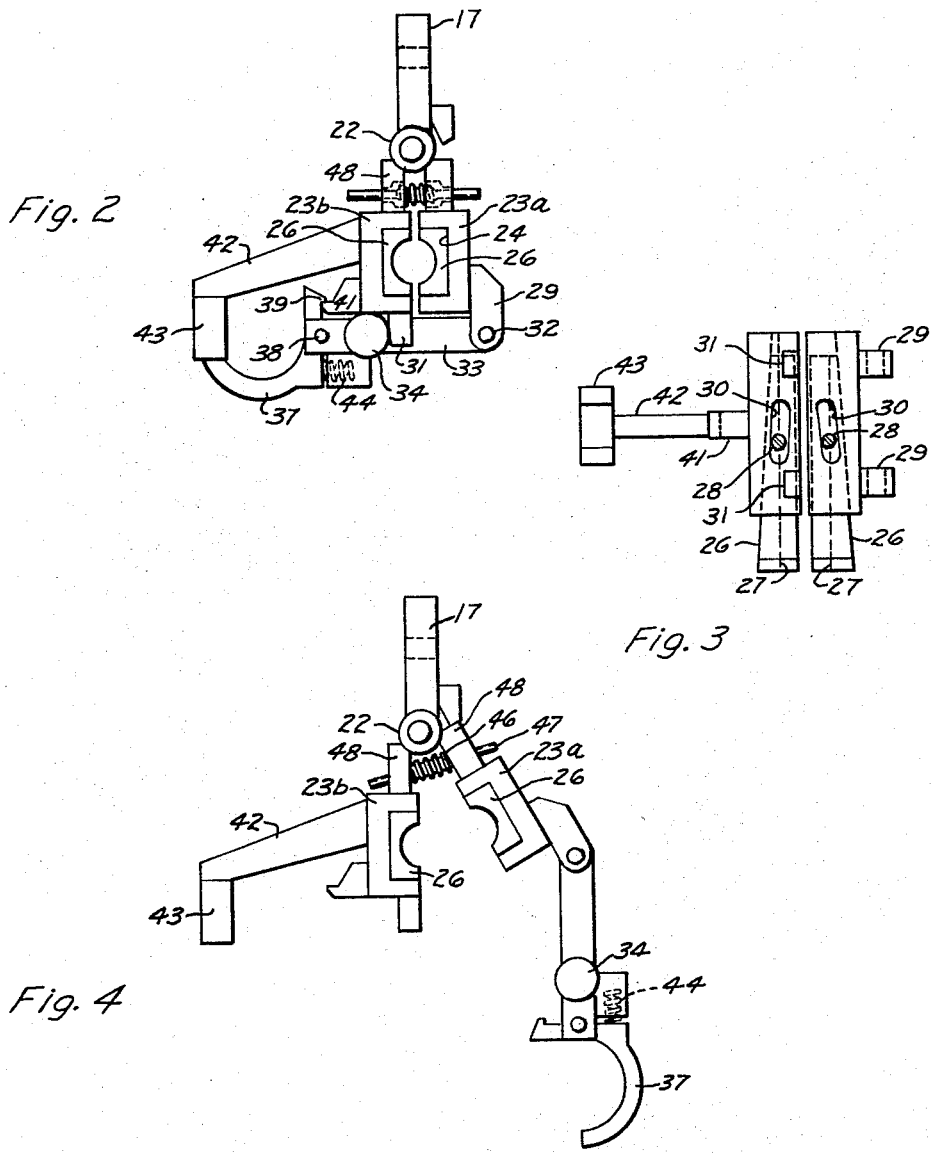

United States Patent Office 3,279,017
Patented Oct. 18, 1966

3,279,017
CABLE GRIPPER
Clair W. Tellefson, Santa Barbara, and Robert M. Bush, Goleta, Calif., assignors to Hydranautics, Santa Barbara, Calif., a corporation of California
Filed Sept. 24, 1964, Ser. No. 398,971
7 Claims. (Cl. 24—126)

This invention relates to cable gripper mechanisms and has particular reference to grippers of the type having a quick release action.

Cable grippers are used in various industries to releasably grasp or seize a cable so that the cable may be pulled to a desired location, and when in place, may be released. Such devices are widely used in the electrical industry for electrical conductor cables, are used in construction work of all kinds wherein metal strand cables operate or support mechanical structures, and are used also in maritime industry for towing cables, breeches buoy cables, supply line cables and others. The requirements for such mechanisms are generally that the cable must be gripped without injury, that the grip must be firm without slipping, that the grip must be strong so that tension forces of many tons may be applied if necessary, and lastly, that the gripper must release the cable without injury to the cable.

It is therefore a general object of the invention to provide an improved cable gripper.

Another object of the invention is to provide a cable gripper of the trigger release type.

Still another object is to provide a releasable cable gripper wherein the cable will fall away from the gripper upon release.

A further object is to provide a releasable cable gripper wherein a very small releasing force is required to release a cable even when the cable is under great tension.

A final object is to provide a cable gripper wherein the wear of parts has been minimized to thereby give long life to the gripper.

Other objects, advantages and features of the invention will be apparent in the following description together with the drawings forming an integral part of the description wherein:

FIG. 2 is an end view of the cable gripper of FIG. 1 showing the gripper in an enclosed or engaged position.

FIG. 3 is a bottom view of the cable gripper of FIG. 2 with the latch bar removed.

FIG. 4 is an end view similar to FIG. 2 but showing the cable gripper in an open or cable releasing position.

Figure 1:
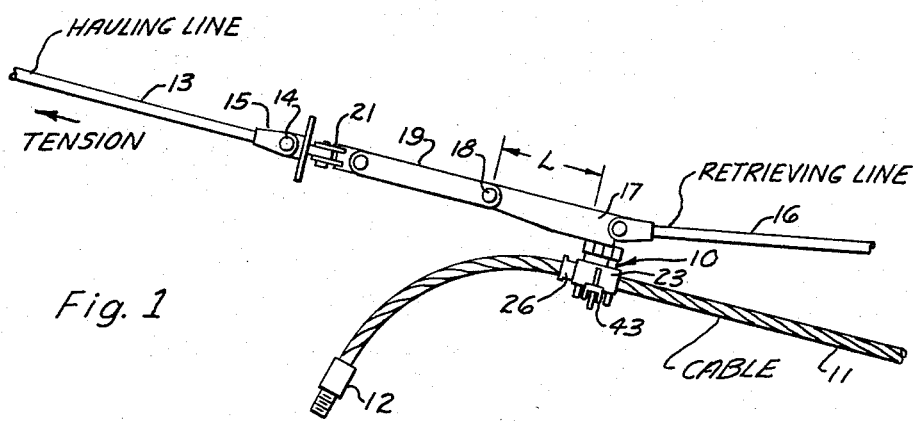
FIG. 1 is an elevation view showing a cable gripper constructed in accordance with the invention gripping a cable pulled taut by means of a hauling line.

Referring to FIG. 1 there is illustrated a cable gripper 10 embodying the invention, which grips a cable 11 of the usual wire rope variety having a fitting 12 secured to one end. A hauling line 13 pulls on the left end of the gripper 10 and is connected by a pin 14 passing through a shackle fitting 15 on the end of the hauling line 13. A retrieving line 16 is connected to the right end of the gripper 10, to recover the gripper after the hauling line 13 has been disconnected and frequently also, when the cable 11 has been released from the gripper.

The upper part of the gripper 10 includes a bar 17 rigidly connected to the gripper body which bar is generally parallel to the cable 11 where it passes through the gripper 10. The left end of the bar 17 is pin jointed at 18 to a link 19 and on the left end of link 19 is a universal joint 21, and the hauling line 13 is directly connected to one end of this universal joint. The universal joint insures a direct pull on the gripper without mechanical binding and if desired the universal joint may be connected directly to the left end of bar 17 as viewed in FIG. 1.

The length of the bar 17 to the left of the body of the gripper as shown in FIG. 1 is selected particularly in accordance with the invention. It has been discovered that under severe tension the gripper tends to turn at 45° to the cable length if the hauling line is connected directly to the gripper body. Such a sharp bend damages the cable being gripped, and this bending is reduced to safe limits by selecting a length L for the bar 17. This length L is found to be not less than 10 diameters of the cable being gripped, and is preferably greater for materials of low yield point such as copper and aluminum cables.

Figure 7:
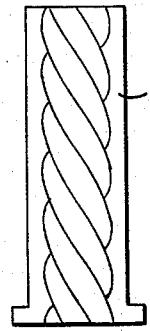
FIG. 7 is a side view of a cable gripping jaw or wedge of FIGS. 2 through 4 contoured to receive a wire rope cable.

Referring now particularly to FIGS. 2, 3, and 4, the gripper 10 is shown in more detail. There it will be noted that the bar 17 is connected to a hinge 22 which supports a split housing 23 split vertically into a right housing member 23a and a left housing member 23b. The two housing members 23a and 23b define a passage 24 of rectangular cross section in which are disposed two jaws 26 that grip the cable 11 of FIG. 1. These jaws are in the shape of wedges as shown most clearly in FIG. 3, and each has a semi-cylindrical recess 27 along their length to grip the cable 11. At least one of the recesses is preferably contoured to receive the surface of the cable, and a wedge recesses to receive wire rope cable is illustrated in FIG. 7. The side interior walls of the housing members 23a and 23b are tapered to match the taper of the wedges 26. Elongated slots 30 is the bottom of housing members 23a and 23b receive screws 28 threaded into the wedges 26 to retain them in place. The depth of the semi-cylindrical recesses 27 are such that the wedges do not touch each other even when fully gripping a cable, so as to preserve the wedging action.

Figure 5:
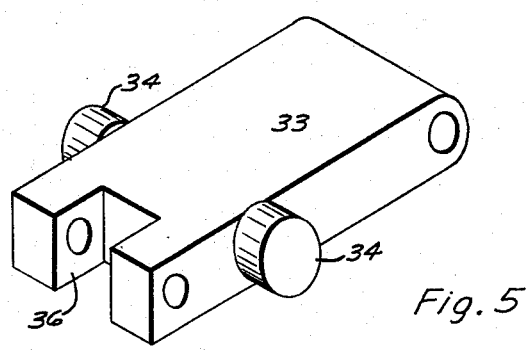
FIG. 5 is a three dimensional view of the latch bar of FIGS. 2 and 4.

The top parts of the housing members 23a and 23b are held together by the hinge 22 and the bottom portions are held together by a latch mechanism which is provided particularly in accordance wit the invention. Projecting downwardly from housing member 23a are a pair of pivot lugs 29, and projecting downwardly from housing member 23b are a pair of latching lugs 31. Pivoted to the lugs 29 by a pin 32 is a latch bar 33 (shown also in FIG. 5) which has a pair of outboard rollers 34 along the sides and a trigger notch 36 in the end remote from the pivot. The rollers 34 engage the latch lugs 31 to hold the bottom portions of the housing members 23a and 23b together as shown best in FIG. 2.

Referring particularly to FIG. 2, a trigger 37 is pivoted by a pin 38 in the notch 36 in the latch bar 33. The upper end of the trigger 37 is provided with a hook 39 which engages a projection 41 from the housing member 23b to form a catch whereby the latch is positively held in its latched or engaged position shown in FIG. 2. To prevent accidental actuation of the trigger 37 a trigger guard 42 is secured to the housing member 23b to project outwardly over the trigger 37 and may terminate in a fork 43 shown in FIGS. 1, 2 and 3. The trigger is rotated in a clockwise direction on its pin 38 by a compression spring 44 held in a downwardly projecting boss on the latch bar 33. This compression spring 44 insures that the trigger hook 39 will engage the catch projection 41.

The rollers 34 on the latch bar 33 are the mechanical devices of the latch which engage the latching lugs and hence, together with the hinge 22, take the entire force of the wedging action as the wedges 26 grip the cable and tend to force the housing members 23a and 23b apart. These rollers 34 are strongly constructed, preferably with needle bearings, and form an anti-friction or low friction engagement. Accordingly, very small forces are needed to release the latch even though the stresses held by the latch may be several tons. It will be noted also that a downward force on the trigger 37 releases the catch 39–41 and that a continuation of this same pull on the trigger 37 causes the entire latch bar 33 to swing downwardly to unlatch the housings 23a and 23b. The low friction rollers 34 accordingly roll on the lugs 31 to release the latch.

Referring to FIG. 1, it will be noted that the tension on the hauling line 13 is in such a direction as to drive the wedges 26 into the housing 23. Hence when the housing members are released by the latch this wedging action tends to force these two housing members 23a and 23b apart. Referring now to FIG. 4, additionally, a compression spring 46 is disposed just under the hinge 22 on an enlarged center portion of a pin 47 held in enlarged holes on hinge plates 48. If desired the left hinge plate 48 in FIGS. 2 and 4 may be stationary with respect to the hauling bar 17 so that the only hinge action taking place is on the right-hand hinge plate 48 as viewed in FIGS. 2 and 4.

Figure 6:
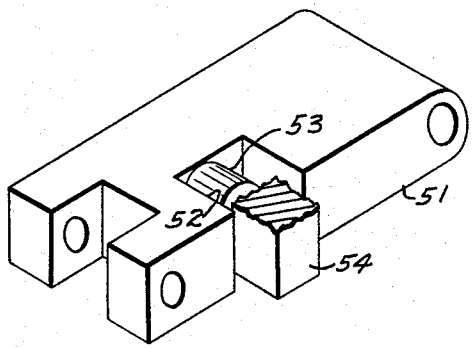
FIG. 6 is a three dimensional view of a modified form of latch bar.

Referring to FIG. 6 there is illustrated a modified form of a latching bar 51 having a cutout portion 52 to receive a roller 53 mounted on a downwardly projecting lug 54 on one of the housing members. This type of latch operates in the same fashion as that of FIG. 5.

In operation, to engage a cable, the gripper is placed in an open position as illustrated in FIG. 4 and the wedge jaws 26 are moved as far to bottom as possible as viewed in FIG. 3. The housing elements 23a and 23b are then manually closed against the compression of spring 46 and the rollers 34 roll over the lugs 31 to latch the two housing members together, and the trigger hook 39 engages the catch projection 41 to hold the latch plate 33 in the latching position shown in FIG. 2.

The wedges 26 are manually pushed into the closed housing members 23a and 23b until they engage the cable. As shown in FIG. 7, one wedge 26 is contoured to more strongly grip the cable. The hauling line 13 (FIG. 1) may then be attached by inserting the pin 14 and the entire cable 11 may then be pulled to any desired location.

During the pulling of the cable 11, bends in the cable adjacent to the gripper 10 are avoided because of the fact that the rigidly attached hauling bar 17 has the length L to the left of the housing 23 that is at least 10 times the diameter of the cable 11.

The universal joint 21 reduces bending of the cable 11 in a vertical plane. When the cable 11 has been pulled to position and it is desired to release the cable, a downward pull is made by means of a line or boat hook on the trigger 37 which rotates counter-clockwise (as viewed in FIG. 2) on its pin 38 to release the catch 39–41. Continued downward pull on the trigger 37 causes the entire latch plate 33 to swing in a vertical plane about its pin 32 in a counter-clockwise direction. The rollers 34 roll on their respective lugs 31 with low friction so that only a small amount of effort is needed to release the latch. The action of the wedges 26 together with the action of the compression spring 46 causes the housing member 23a to swing counter-clockwise and away from the housing member 23b as shown in FIG. 4. The cable being gripped immediately drops vertically downwardly. The hauling line 13 may next be removed by removing the pin 14 and the gripper 10 may be returned to its starting location by means of the retrieving line 16. If it is not desired to return the gripper to its starting location, the retrieving line 16 may be eliminated.

It will be noted that the overhead suspension of the gripper together with the vertical splitting of the housing members enables the cable to drop away by its own weight when the gripper is released.

The wedging action of the jaws 26 in the closed gripper shown in FIG. 2 utilizes tension in the cable 11 to more securely grip the cable. The use of the rollers 34 not only reduces friction but eliminates a sliding action at the point of greatest bearing pressure and thereby gives rise to a long life because of freedom from wear. The trigger guard 42–43 protects the trigger from accidental release if the device should be accidentally struck by other cables or mechanical structures.

While the invention has been described with reference to specific embodiments thereof, it is not limited to the structure disclosed but all modifications and variations that fall within the true spirit and scope of the invention are included in the following claims.

What is claimed is:
1. A cable gripper of the quick release type comprising:
    (a) pair of side-by-side wedges having longitudinal semi-cylindrical recesses on adjoining sides to engage a cable;
    (b) a vertically split housing encircling the wedges and having tapered interior side walls to match the taper of the wedges, said housing being formed of housing members each having upper and lower portions;
    (c) a hinge connecting together the upper portions of the housing members of the split housing;
    (d) means for connecting a hauling line to the hinge;
    (e) a latch connecting the lower portions of the housing members of the split housing; and
    (f) a trigger catch connecting the housing and latch for releasably holding the latch in engaged position.
2. A cable gripper as defined in claim 1 wherein the latch includes: a latch bar hinged to one housing member to swing in a vertical plane; a latch lug on the other housing member engageable by the latch bar; and anti-friction means disposed between the latch bar and the latch lug.
3. A cable gripper as defined in claim 2 wherein the trigger catch is connected to the latch bar and is released by a downward force which force also unlatches the latch.
4. A cable gripper as defined in claim 1 wherein the means for connecting a hauling line to the hinge is a bar secured to the hinge to be generally parallel to the semi-cylindrical recesses of the wedges and having a length projecting past the housing of at least 10 diameters of the semi-cylindrical recesses to avoid any sharp bending of the cable at the gripper when the cable is under tension.
5. A cable gripper as defined in claim 4 wherein a universal joint is connected to the outer end of the bar, so that a hauling line connected to the universal joint will not twist the gripper.
6. A cable gripper as defined in claim 1 wherein the semi-cylindrical recess of at least one wedge is contoured to receive the surface of a cable to be gripped.
7. A cable gripper as defined in claim 1 wherein a trig- ger guard is secured to one housing member to project over the trigger to protect it from accidental actuation.

References Cited by the Examiner

UNITED STATES PATENTS 2,356,805 8/1944 Wilson _____ 294—90
2,983,012 5/1961 Madden _____ 24—126

FOREIGN PATENTS 832,594 4/1960 Great Britain.
862,411 3/1961 Great Britain.

GERALD M. FORLENZA, *Primary Examiner.*
G. F. ABRAHAM, *Assistant Examiner.*